Figure 1:
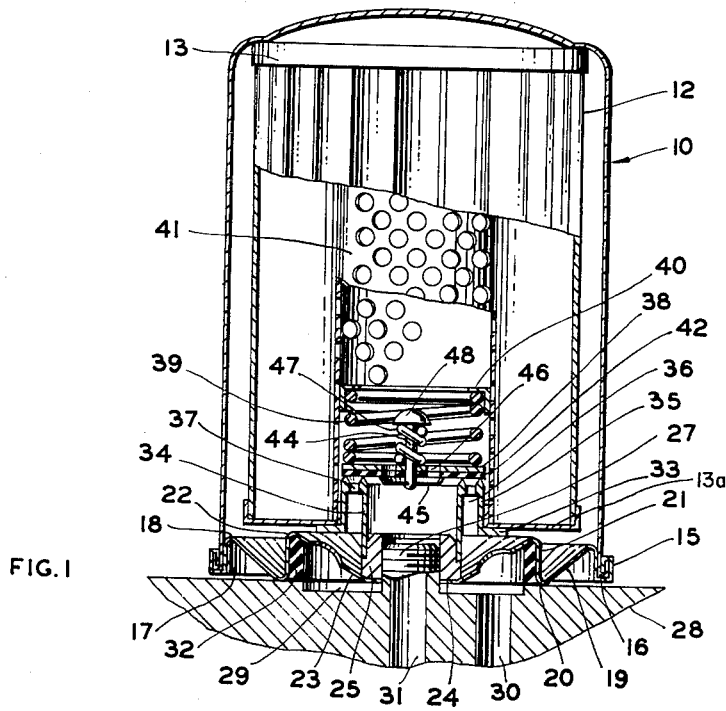

July 3, 1962  F. R. GRUNER  3,042,215
THROWAWAY OIL FILTER
Filed March 3, 1960

FREDERICK R. GRUNER
INVENTOR.

BY Lawrence J. Winter
ATTORNEY ably cemented adjacent the inner side of compression

3,042,215
THROWAWAY OIL FILTER
Frederick R. Gruner, Westfield, N.J., assignor to Purolator Products, Inc., Rahway, N.J., a corporation of Delaware
Filed Mar. 3, 1960, Ser. No. 12,589
2 Claims. (Cl. 210—443)

The present invention relates to an oil filter and more particularly, to an oil filter in which a filter cartridge is permanently enclosed within a shell and the entire unit is discarded when the filter needs replacement.

In a throwaway type filter in which the cartridge is permanently encased within a thin metal shell, it is necessary that the unit be constructed as inexpensively as possible, since the entire unit is discarded or thrown away when the filter cartridge therein needs replacement. This type of filter has certain advantages. It seldom requires tools to be used in mounting it upon an engine, as it is merely screwed against the engine block by hand. It can also be changed by unskilled personnel since it is only necessary to unthread it in the opposite direction from which it is threaded on to the block when a new unit replaces it. The contaminants in the oil remain in the casing which have been filtered from the oil remain in the casing and there is no mess, since it is discarded along with the used unit and eliminates the time and effort generally necessary to clean conventional oil filter units which are not of the throwaway type.

In accordance with the present invention, a throwaway screw-on type oil filter is provided in which the shell or casing containing the filter cartridge is made entirely of thin sheet metal and eliminates the heavy or thick reinforcement bottom plate required heretofore, such as that disclosed in Patent 2,877,902. Heretofore, it has been necessary to construct a throwaway type filter element in which the filter cartridge is permanently sealed within a thin metal casing, with an additional thick metal bottom plate generally referred to in the art as a reinforcement plate. This was necessary in order to properly seal the bottom plate of the thin metal cup shaped shell to prevent oil leakage between the filter shell and engine block due to the high internal oil pressure of 100 pounds or more developed in engines in which the oil filter is used.

The high internal oil pressure from the internal combustion engine, upon entering the thin metal filter shell, tends to cause the shell ends to bulge or enlarge, somewhat like the action which occurs when air under pressure fills a balloon. Since the oil filter cartridge is anchored to the engine block by a centrally located threaded boss, the high internal pressure within the shell causes the thin metal around the boss, and particularly adjacent the peripheral portion of the shell, to move away from the engine block and form a gap, so that the high pressure oil will leak out between the engine block and bottom of the oil filter shell. This has only been prevented by reinforcing the bottom of the filter shell with a heavy metal plate to prevent this end of the shell from bulging. Such a structure has also eliminated oil leaks in the interlocked seam forming the joint between the cylindrical portion of the shell and its bottom member.

The object of the present invention is to provide a throwaway type screw-on oil filter unit in which the cylindrical shell is made of thin metal and the bottom member is also made of thin sheet metal material of approximately the same thickness as the cup shaped shell, to eliminate the necessity for a heavy reinforcement plate while at the same time preventing oil leakage between the block and filter shell or out of the interlocked joint. These results have been obtained by providing a sheet metal bottom closure member with annular tension bands and vertical compression bands provided therein to withstand high internal oil pressure present in full flow filters and materially reduce the expenses involved in manufacturing such an oil filter unit. The thin bottom closure member by its very shape of being divided into a series of rigid elements, resists collapsing or distortion at high pressure. This shape acts as a large diaphragm spring which gives the filter a self-locking anti-vibration fastening to the engine block.

Figure 2:
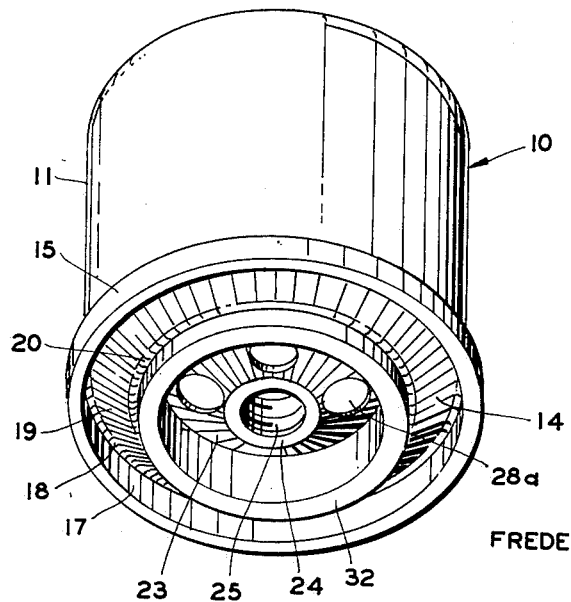

Various other objects and advantages of the present invention will be readily apparent from the following detailed description, when considered in connection with the accompanying drawing forming a part thereof, and in which:

FIG. 1 is a side elevational view, partly in section, illustrating the invention; and FIG. 2 is a perspective view showing the configuration of the sheet metal bottom member embodied in the present invention.

Referring to the drawings, the reference numeral 10 generally designates an oil filter comprising a cup shaped shell or casing 11 made of thin sheet metal, preferably having a thickness of approximately 0.015 inch. An annular resin impregnated pleated paper filter element 12 is disposed within the casing, having a circular upper end cap 13 and an annular lower end cap 13a sealing off the opposite edges of the pleats. The filter cartridge is permanently sealed within the casing by a thin sheet metal bottom member 14, preferably having a thickness of approximately 0.015 inch. The cup portion 11 is preferably a drawn case, while the bottom member 14 is made by stamping.

Bottom member 14 is provided with a lip 15 that is rolled over the out-turned lip 16 on the lower edge of the casing to form an interlocking oil tight joint therewith. Adjacent the inside of lip 15, the bottom member is provided with a substantially vertical annular compression band 17 which extends upwardly and through radius 18 is joined to a downwardly and inwardly inclined tension annulus 19 having an inclination of approximately 45 degrees. Compression band 17 makes it possible, during the manufacture of the filter, to position a backup member, not shown, adjacent the inside of casing 11 to form the oil tight joint provided by rolling lip 15 over lip 16. The lower end of the tension annulus 19 through radius 20, is joined to a second substantially vertical compression band 21 which has its upper end creased as at 22, and is joined to a second downwnardly and inwardly inclined tension annulus 23 having an inclination of approximately 45 degrees. The lower end of inner annulus 23, which is longer than annulus 19, terminates in a substantially horizontal annular ring 24 providing a central opening therein. An internally threaded boss 25 is spot-welded or spun on to ring 24 to secure the filter unit to a threaded adapter bushing 27 provided in the engine block 28.

The engine block 28 is provided with an annular oil inlet recess 29 therein in communication with an oil inlet passage 30 in the block to receive oil to be filtered from an oil pump not shown. Bottom member 14 is provided with spaced oil inlet ports 28a circumferentially disposed around boss 25 in second tension annulus 23 in communication with recess 29. Adapter bushing 27 communicates with an oil discharge passage 31 in the engine block to send clean oil to the engine parts requiring lubrication. An annular rubber ring gasket 32, which is preferably cemented adjacent the inner side of compression band 21, provides a seal between the filter unit and the engine block adjacent the outer side of recess 29, to prevent any leakage of oil therebetween.

The filter cartridge 12 is supported on the lip of an annular support member 33 mounted over the upper part of boss 25. Support member 33 is provided with spaced inner and outer sleeves 34 and 35 respectively forming an annular chamber 36 therebetween. Oil by-pass ports 37 are disposed in the lateral portion of the support member. A circular by-pass valve disc 38 is normally held seated or in a closed position over the ports by a spring member 39 mounted under an annular retainer ring 40 spot-welded to the filter center tube 41. Valve disc 38 is preferably provided with a rubber gasket 42 cemented to the bottom of it.

Valve disc 38 is provided with a central opening therein through which extends a valve stem 44 which has an anti-drainback valve 45 secured to the lower end thereof to close off the oil outlet ports 46 circumferentially disposed in the disc around valve stem 44. A spring member 47 is mounted around the valve stem above disc 38 and below an enlarged head 48 on the valve stem to hold the anti-drainback valve closed, execpt when oil is flowing through the filter cartridge.

In operation, when the engine is started, oil is forced through passage 30 and the engine block recess 29 and enters the oil filter casing 11 through the oil inlet ports 28a flowing through the filter cartridge and into the center tube. The pressure of the oil overcomes the force in spring 47 holding the anti-drainback valve closed, and oil is discharged through inner sleeve 34 and boss 25 and flows back into the engine through discharge passage 31.

The bottom member 14 prevents any oil from leaking around the gasket 32 and prevents the oil filter casing from bulging due to the high internal oil pressure therein because of the configuration of the tension annuli and compression bands. The oil pressure within the filter casing tends to force or bulge a conventional casing outwardly along the tension annulus 19 so that the interlocked joint formed by rings 15 and 16 will attempt to move away from the engine block to leave a gap therebetween. This occurs because there is no force on the outside of annulus 19 to oppose the high pressure oil within casing 11. However, flexing of the casing here is prevented because of the configuration of the member 14. Annulus 19 is in tension and compression band 21 has extra material due to its shape with respect to 19 to compensate for this high pressure force and so that annulus 19 tends to move in a direction toward the engine block, thereby insuring a tight seal along gasket 32. When the high pressure force is removed, member 14 will flex back to its original position, if it flexed at all, so that the configuration acts as a large diaphragm spring which in effect is a self-locking anti-vibration fastener with respect to the engine block. This force of the oil will have no effect on compression band 21, since it is a compression structure.

Thus, the present invention provides a thin metal throwaway type filter unit which eliminates the need for a thick or heavy reinforcement bottom plate to prevent the casing from pulling away from the engine block on which it is screwed due to high internal oil pressure in the oil flowed therethrough.

Inasmuch as various changes may be made in the form, location and relative arrangement of the several parts without departing from the essential characteristics of the invention, it will be understood that the invention is not to be limited except by the scope of the appended claims.

What is claimed is:

1. A throwaway type filter comprising a cup shaped shell, a filter element disposed within said shell, a member closing the end of said shell for sealing said element therein, means for interfastening the peripheries of said member and said end, said member being made of thin sheet metal shaped to form a substantially vertical annular band extending upwardly from said end's lower portion in telescoped relation therewith and an inclined annulus joined with the upper end of said band and extending downwardly and inwardly therefrom and a second substantially vertical band joined with and extending upwardly from the lower end of said annulus and a second inclined annulus joined with the upper end of said second band and extending downwardly and inwardly therefrom and terminating with a central opening, a tubular part located in said opening, means for interfastening said part and the lower end of said second annulus, the latter having at least one hole formed therethrough and said part having means for connecting it with a throwaway filter mounting tubular part, a ring gasket positioned on the lower surface of said bottom member radially inwardly adjacent to said second band and projecting below the lower end thereof, and means within said shell for causing fluid flowing through said hole and the first named tubular part to flow through said filter element, said sheet metal being thin enough to permit said bottom member to act like a diaphragm spring when said parts are interconnected and said member is placed under stress and said bands substantially resisting bulging of said member.

2. A throwaway type filter comprising a cup shaped shell, a filter element disposed within said shell, a member closing the end of said shell for sealing said element therein, means for interfastening the peripheries of said member and said end, said member being made of thin sheet metal shaped to form a substantially vertical annular band extending upwardly from said end's lower portion in telescoped relation therewith and an inclined annulus joined with the upper end of said band and extending downwardly and inwardly therefrom and a second substantially vertical band joined with and extending upwardly from the lower end of said annulus and a second inclined annulus joined with the upper end of said second band and extending downwardly and inwardly therefrom and terminating with a central opening, a tubular part located in said opening, means for interfastening said part and the lower end of said second annulus, the latter having at least one hole formed therethrough and said part having means for connecting it with a throwaway filter mounting tubular part, a ring gasket positioned on the lower surface of said bottom member radially inwardly adjacent to said second band and projecting below the lower end thereof, and means within said shell for causing fluid flowing through said hole and the first named tubular part to flow through said filter element, said sheet metal being thin enough to permit said bottom member to act like a diaphragm spring when said parts are interconnected and said member is placed under stress and said bands substantially resisting bulging of said member, said ring gasket being tubular and fitting the inner side of said second band in telescoped relation therewith and being long enough to project a substantial distance below said second band's lower end.

References Cited in the file of this patent

UNITED STATES PATENTS

| | | |
|---|---|---|
| 1,940,316 | McKinley | Dec. 19, 1953 |
| 2,877,902 | Chase et al. | Mar. 17, 1959 |
| 2,884,133 | Walulik et al. | Apr. 28, 1959 |
| 2,888,141 | Coates et al. | May 26, 1959 |
| 2,995,250 | Boewe et al. | Aug. 8, 1961 |